United States Patent
Strommer

(10) Patent No.: US 8,744,051 B2
(45) Date of Patent: Jun. 3, 2014

(54) TRANSLATION OF FEES FOR VALUE ADDED SERVICES IN A COMMUNICATION NETWORK

(75) Inventor: Martin Strommer, Alexandria (AU)

(73) Assignee: Motorola Mobility LLC, Chicago, IL (US)

( * ) Notice: Subject to any disclaimer, the term of this patent is extended or adjusted under 35 U.S.C. 154(b) by 1203 days.

(21) Appl. No.: 12/542,066

(22) Filed: Aug. 17, 2009

(65) Prior Publication Data

US 2010/0111273 A1    May 6, 2010

Related U.S. Application Data

(60) Provisional application No. 61/110,471, filed on Oct. 31, 2008.

(51) Int. Cl.
*H04M 15/00* (2006.01)
*H04M 17/00* (2006.01)

(52) U.S. Cl.
CPC .............. *H04M 15/68* (2013.01); *H04M 17/00* (2013.01)
USPC .................................. 379/114.05; 379/114.2

(58) Field of Classification Search
CPC ...................................................... H04M 15/68
USPC ............. 379/114.05–114.13, 114.15, 114.17, 379/114.2
See application file for complete search history.

(56) References Cited

U.S. PATENT DOCUMENTS

| | | | | |
|---|---|---|---|---|
| 5,590,184 A * | 12/1996 | London | | 379/142.09 |
| 5,905,773 A * | 5/1999 | Wong | | 379/88.03 |
| 6,282,276 B1 * | 8/2001 | Felger | | 379/114.19 |
| 7,340,045 B2 * | 3/2008 | Felger | | 379/115.02 |
| 7,613,449 B2 * | 11/2009 | Romppanen et al. | | 455/412.1 |
| 7,978,843 B1 * | 7/2011 | Cope et al. | | 379/221.14 |
| 8,583,527 B2 * | 11/2013 | Polozola et al. | | 705/35 |
| 2008/0027839 A1 * | 1/2008 | O'Regan et al. | | 705/34 |
| 2008/0318554 A1 * | 12/2008 | Romppanen et al. | | 455/412.2 |

* cited by examiner

*Primary Examiner* — Quoc D Tran

(57) ABSTRACT

A method (300) for translating fees for a value added service in a communication network, and a charging gateway (116) that translates fees for a value added service in a communication network. A request (130, 134) for a communication device to access the value added service can be received and, in real time, translated to a first pseudo telephone number. In real time, a first telephone call (136) to the first pseudo telephone number can be simulated to generate a first call request (138) that inquires whether credit for the value added service is available. An acknowledgement (140) to the first call request can be received that indicates whether a sufficient amount of credit to access the value added services is available. Access or denial to the value added services can be based on whether the sufficient amount of credit is available.

20 Claims, 3 Drawing Sheets

TRANSLATION OF FEES FOR VALUE ADDED SERVICES IN A COMMUNICATION NETWORK

CROSS REFERENCES TO RELATED APPLICATIONS

This application claims benefit of U.S. provisional patent application Ser. No. 61/110,471, filed Oct. 31, 2008, which is herein incorporated by reference.

BACKGROUND OF THE INVENTION

1. Field of the Invention

The present invention generally relates to communication networks and, more particularly, to the charging of value added services in a communication network.

2. Background of the Invention

In modern communication networks, value added services oftentimes are made available to subscribers (hereinafter referred to as "users"). Examples of such value added services include access to network bandwidth (e.g. to access the Internet), premium service items such as ringtones and icons which may be instantiated in personal communication devices, and downloadable games and multimedia content. Users typically incur a fee for accessing such value added services.

In some market segments, user charges for value added services must be pre-authorized. For instance, users may be required to provide a deposit for services to be accessed, or the users must qualify for an extension of credit. Significant time delays can occur between when the value added services are requested/delivered, and when the necessary financial authorizations are completed. In such instances, users sometimes are able to access value added services which exceed the users' pre-authorized credits. In consequence, appropriate fees for value added services that are provided sometimes remain unpaid. Moreover, in some instances, unscrupulous users manipulate the delays that occur between when the value added services are requested and delivered to intentionally defraud the value added service providers from fees which are due.

SUMMARY OF THE INVENTION

The present invention relates to a method of translating fees for a value added service in a communication network. The method can include receiving a request for a communication device to access the value added service and, in real time, translating the request to access the value added service to a first pseudo telephone number. The method further can include, in real time, simulating a first telephone call to the first pseudo telephone number to generate a first call request that inquires whether credit for the value added service is available. A response to the first call request can be received that indicates whether a sufficient amount of credit to access the value added services is available. When the response to the first call request indicates that the sufficient amount of credit is available, access to the requested value added service can be granted. When the response to the first call request indicates that the sufficient amount of credit is not available, access to the requested value added service can be denied.

The present invention also relates to a charging gateway. The charging gateway can include a processor that receives a request for a communication device to access a value added service and, in real time, translates the request to access the value added service to a first pseudo telephone number. In real time, the processor can simulate a first telephone call to the first pseudo telephone number to generate a first call request that inquires whether credit for the value added service is available. The processor also can receive a response to the first call request that indicates whether a sufficient amount of credit to access the value added services is available. When the response to the first call request indicates that the sufficient amount of credit is available, the processor can grant access to the requested value added service. When the response to the first call request indicates that the sufficient amount of credit is not available, the processor can deny access to the requested value added service.

Yet another embodiment of the present invention can include a computer program product including a computer-usable medium having computer-usable program code that, when executed, causes a machine to perform the various steps and/or functions described herein.

BRIEF DESCRIPTION OF THE DRAWINGS

Preferred embodiments of the present invention will be described below in more detail, with reference to the accompanying drawings, in which.

DETAILED DESCRIPTION

Figure 1:
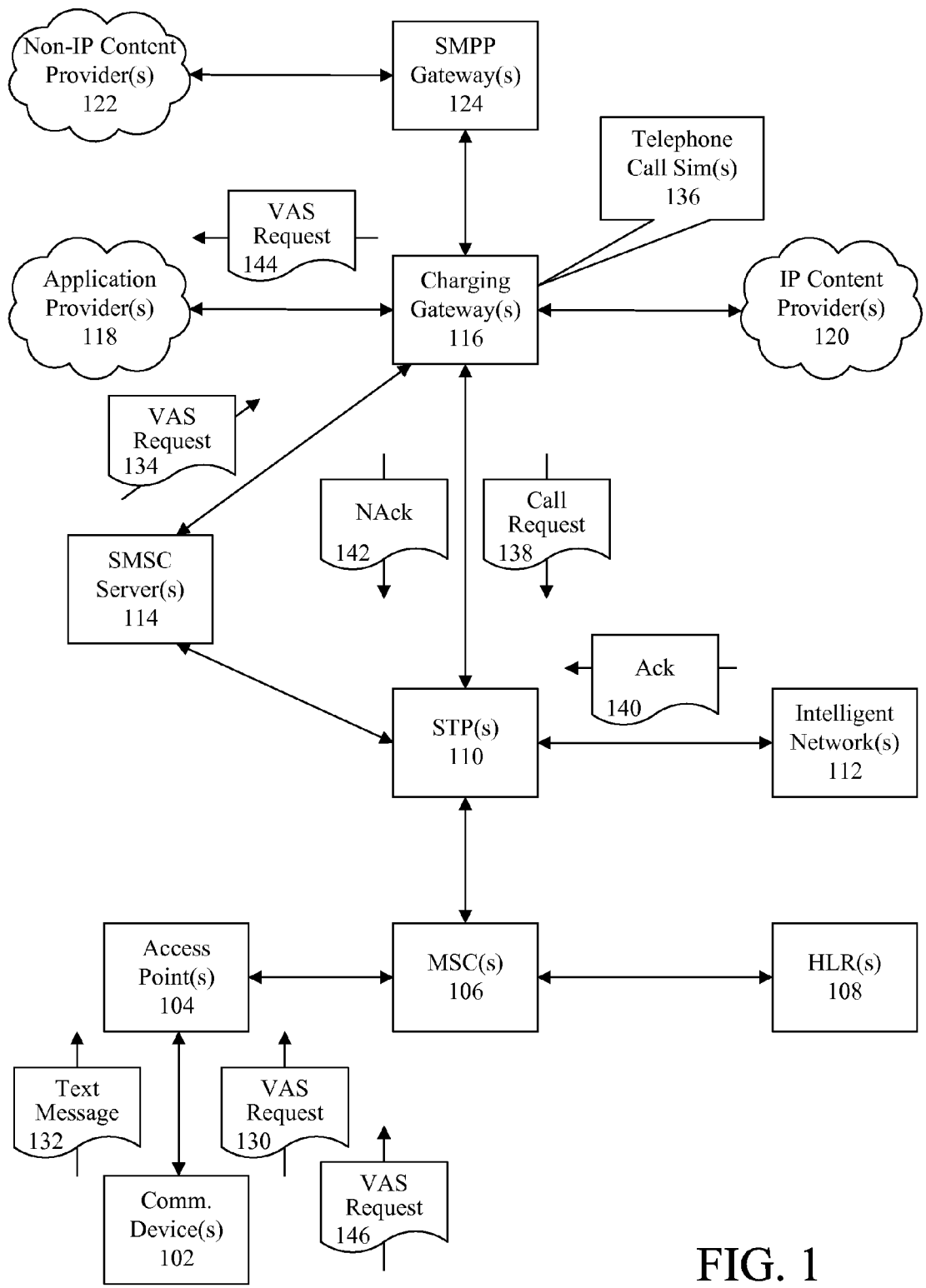
FIG. 1 depicts a communication system that is useful for understanding the present invention.

While the specification concludes with claims defining features of the invention that are regarded as novel, it is believed that the invention will be better understood from a consideration of the description in conjunction with the drawings. As required, detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure. Further, the terms and phrases used herein are not intended to be limiting but rather to provide an understandable description of the invention.

Arrangements described herein relate to translation of fees for value added services in a communication network. In particular, a request to access a value added service that is available to a communication network subscriber (hereinafter referred to as "user") may be received for the corresponding communication device and processed by a charging gateway. In real time, the charging gateway can communicate with an intelligent network to authorize a transaction for the value added service. More particularly, the charging gateway can translate a request for a value added service to a corresponding pseudo telephone number, and simulate a call being placed to the pseudo telephone number from the communication device.

When simulating the call, the charging gateway can communicate a call request to the intelligent network in order to verify, reserve, debit and/or credit a commensurate fee to the user's credit account. Such call request can indicate the communication device and/or user for which the telephone call is being simulated, the pseudo telephone number, a type of service being requested, a type of charge being requested, an account against which the charge is being requested, and/or any other desired information.

When the intelligent network receives the call request, in real time the intelligent network node can determine whether a sufficient amount of credit is available to the user associated with the communication device (or the user's account), and communicate to the charging gateway a response that indicates whether the sufficient amount of credit is available. When the sufficient amount of credit is available, the charging gateway can grant the communication device/user access to the requested value added service. When a sufficient amount of credit is not available, access to the requested value added service can be denied.

As used herein, the term "real time" means a level of processing responsiveness that a user or system senses as sufficiently immediate for a particular process or determination to be made, or that enables the processor to keep up with some external process.

The term "value added service," as used herein, means services that are available to users of a communication network, but for which additional charges may apply in addition to base fees that are charged. Examples of value added services include, but are not limited to, access to downloadable ringtones, icons, applications/software, etc., communication (e.g. sending or receiving) of messages in accordance with the simple messaging service (SMS) protocol, data services (e.g. communication access to external networks and/or systems, such as the Internet), and so on.

As used herein, the term "pseudo telephone number" means a telephone number that may be used to simulate a telephone call for the purpose of authorizing transactions for the value added services or indicate charge adjustments. As used herein, a simulated telephone call is a simulation of a telephone call being placed without actually dialing a telephone number. The term "flagfall," as used herein, means the setting of a flag or value within the intelligent network that indicates a charge to be authorized or a charge to be adjusted.

FIG. 1 depicts a communication system 100 that is useful for understanding the present invention. The communication system 100 can include at least one communication device 102. The communication device 102 can be a mobile telephone, a mobile radio, a personal digital assistant, a computer, a mobile computer, a mobile terminal, an application specific device, or any other device that may access value added services within the communication system 100.

The communication system 100 also can include at least one access point 104. The access point 104 can be, for example, a base transceiver station, a repeater, a LAN access point, a WLAN access point, a router, a switch, or any other system comprising equipment for communicating with communication devices, such as the communication device 102. As such, each access point 104 can comprise one or more wired and/or wireless communication adapters, as well as other suitable components.

In an arrangement in which the communication system 100 includes one or more mobile communication networks, the communication system 100 can include at least one mobile switching center (MSC) 106 and at least one home location register (HLR) 108. The MSC(s) 106 can control switching subsystems for the mobile communication networks. The HLR(s) 108 can comprise one or more databases that contain details of each communication device 102 that is authorized to access such mobile communication networks.

The communication system 100 can include a signal transfer point (STP) 110, which can serve as a packet switch within the communication system 100 to route signals among the various elements of the communication system 100. In addition, one or more intelligent network(s) 112 can be provided. The intelligent network 112 can process transactions for value added services requested by the communication device 102. For example, the intelligent network 112 can process financial transactions corresponding to the requested value added services.

The communication system 100 can include at least one short messaging service center (SMSC) 114. The SMSC server 114 can receive and deliver messages formatted in accordance with the short message service (SMS) protocol, for example text messages. SMS messages communicated by the communication device 102 can be routed to the SMSC server 114, which then can route the SMS messages to their appropriate destinations via suitable network resources. In addition, the SMSC server 114 can receive SMS messages addressed to the communication device 102, and route such messages to the communication device 102 via suitable network resources.

Communication devices 102, access points 104, MSCs 106, HLRs 108, STPs 110, intelligent networks 112 and SMSC servers 114 all are well known to the skilled artisan. Nonetheless, these components 102, 104, 106, 108, 110, 112, 114 of the communication system 100 can be configured (e.g. using suitable applications/software/firmware) to perform methods and processes in accordance with their respective inventive arrangements as described herein. Moreover, the functionality of any of the communication system components 102, 104, 106, 108, 110, 112, 114 may be distributed among any number of devices, as is appreciated by those skilled in the art. For example, the functions of a single component 102, 104, 106, 108, 110, 112, 114 may be distributed among multiple devices. Moreover, the functionality of multiple components 102, 104, 106, 108, 110, 112, 114 may be performed by a single device, or a plurality of devices which may or may not duplicate functions.

The communication system 100 further can include a charging gateway 116, which can collect, aggregate and store user session data in real time. Further, the charging gateway 116 can bridge resources provided by value added service providers, for example application providers 118, IP content providers 120 and non-IP content providers 122, with other nodes of the communication system 100, for example the communication device 102, the access point 104, the MSC 106, the HLR 108, the STP 110, the intelligent network 112 and the SMSC server 114.

For certain non-IP content providers 122, such as those that exchange messages in accordance with the short message peer-to-peer (SMPP) protocol, another gateway, for instance a SMPP gateway 124, can be provided in the communication system to act as an interface between such non-IP content providers 122 and the charging gateway 116. SMPP gateways also are well known in the art. Nonetheless, the SMPP gateway 124 also can be configured to perform methods and processes in accordance with the inventive arrangements as described herein.

When a value added service is desired by the communication device 102, or a user of the communication device 102, the communication device 102 can communicate a value added service request 130 to the charging gateway 116 via suitable nodes of the communication system 100. For instance, the value added service request 130 can be communicated to the charging gateway 116 via the access point 104, the MSC 106, and the STP 110.

In an arrangement in which the value added service desired by the communication device 102 is the delivery of a text message 132, for instance a text message formatted in accordance with the SMS protocol, rather than communicating the value added service request 130 to the charging gateway, the communication device 102 can communicate the text message 132 to the SMSC server 114. In this regard, the SMSC server 114 can be considered a value added service provider. In response to receiving the text message 132, the SMSC server 114 can communicate a value added service request 134 to the charging gateway 116. The value added service request 134 can request authorization to deliver the text message 132 to an intended recipient. Similarly, if a text message addressed to the communication device 102 has been sent to the SMSC server 114 from another device, the SMSC server 114 can communicate a corresponding value added service request 134 requesting authorization to deliver such text message to the communication device 102.

When the charging gateway 116 receives the value added service request 130, 134, the charging gateway 116 can, in real time, simulate a telephone call being placed to a suitable pseudo telephone number. The pseudo telephone number can correspond to a charge to be verified, reserved and/or debited from the user's credit account. For example, if the charge to be verified, reserved and/or debited is a first amount, the pseudo telephone number can be a first pseudo telephone number, for instance 333-1111. If the charge to be verified, reserved and/or debited is a second amount, the pseudo telephone number can be a second pseudo telephone number that is different than the first pseudo telephone number (e.g. 333-1112), and so on.

When the charging gateway 116 simulates a telephone call 136 to a suitable pseudo telephone number being simulated, a call request 138 can be communicated in real time from the charging gateway 116 to the intelligent network 112 (e.g. to one or more nodes of the intelligent network 112). The call request 138 can be communicated in accordance with a protocol that supports voice call charging processes, for instance the Customized Applications for Mobile network Enhanced Logic (CAMEL) protocol. The call request 138 can be a request that inquires whether credit for the requested value added service is available to the communication device 102 and/or the user of the communication device 102. The call request 138 can indicate the communication device 102 for which the telephone call is simulated, an account against which the charge is being requested, the pseudo telephone number, a type of service being requested, a type of charge being requested, whether to reserve or charge the requested amount, and/or any other desired information.

In response to receiving the call request 138, the intelligent network 112 can, in real time, trigger a flagfall corresponding to the call charge information. For instance, a flagfall for a first amount can be triggered if the pseudo telephone call is received in response to the telephone call being to the first pseudo telephone number being simulated, a flagfall for a second amount can be triggered if the pseudo telephone call is received in response to the telephone call to the second pseudo telephone number being simulated, and so on.

In response to the flagfall, the intelligent network 112 can, in real time, verify whether credit for the identified charges is available in an appropriate credit account, for instance an account associated with the communication device 102 and/or a user of the communication device 102. If suitable credit is available, the intelligent network 112 can, in real time, communicate a response, such as an acknowledgement 140, to the charging gateway 116 verifying such. The intelligent network 112 also can, in real time, reserve the amount charged, or debit such amount from the available credit. If, however, sufficient credit is not available in the credit account, the acknowledgement 140 can indicate that the charge request is declined.

After receiving the acknowledgement 140, the charging gateway 116 can immediately terminate or release the simulated telephone call. Accordingly, charges to the communication device 102/user account for use of the communication system 100 can be avoided, other than those charges for the requested services. If, the acknowledgement 140 indicates that the request is declined, the charging gateway 116 can deny the request to access the value added services. For example, the charging gateway can communicate a negative acknowledgement 142 to the communication device 102. Optionally, the reason for the denial of access also can be indicated in the negative acknowledgement 142. If the simulated telephone call was initiated in response to receiving a value added service request 134 from the SMSC server 114, the charging gateway 116 also can generate a negative acknowledgement 142 to the SMSC server 114.

If, however, the acknowledgement 140 indicates that sufficient credit for the charge is available, the charging gateway 116 can grant the communication device 102 and/or a user of the communication device 102 access to the requested value added services, grant the SMSC server 114 authorization to deliver a text message generated by the communication device 102, or grant the SMSC server 114 authorization to deliver a text message generated by the communication device 102.

If the value added service request 130 requests a value added service from a value added service provider 118, 120, 122, the charging gateway 116 can communicate a value added service request 144 to the value added service provider 118, 120, 122 that provides the value added service requested by the communication device 102. For example, if the communication device 102 has requested access to an application, the charging gateway can communicate the value added service request 144 to the application provider 118, which then can provide to the communication device 102 access to the requested application. Similarly, if the communication device 102 has requested access to non-IP content, the charging gateway can communicate the value added service request 144 to the Non-IP content provider 122 via the SMPP gateway 124, which then can provide to the communication device 102 access to the requested non-IP content. If the communication device 102 has requested access to IP content, the charging gateway can communicate the value added service request 144 to the IP content provider 120, which then can provide to the communication device 102 access to the requested IP content.

The value added service providers 114, 118, 120, 122 can respond to the authorization/value added service request 144 to indicate whether the authorization/value added service request was received. In an arrangement in which fees for the value added services were only reserved, but not deducted, from the appropriate credit account, the charging gateway 116 can simulate another telephone call to a corresponding pseudo telephone number in order to indicate to the intelligent network 112 to actually debit the fees from the credit account of the communication device 102/user. The intelligent network 112 can process the corresponding call request 138 as previously described.

In some instances, access to the value added services may not cost a fixed fee. Instead the communication device 102/user account may be charged for the amount of use of the value added services. In such circumstances, the charging gateway can monitor the usage of value added service by the communication device 102. When the usage of the value added service approaches, or reaches, a point in which additional fees are required to continue use of the value added service, the charging gateway 116 again can simulate a telephone call to a suitable pseudo telephone number to inquire whether credit for additional use of the value added service is available. Accordingly, another call request 138 can be communicated to the intelligent network 112. Another corresponding flagfall also can be triggered by the intelligent network 112, and the aforementioned process can repeat until the communication session with the communication device 102 is ended or sufficient credit is no longer available to continue the communication session.

If a point in the communication session is reached in which sufficient credit is no longer available, the charging gateway can communicate a negative acknowledgement 142 to the communication device 102 to indicate that access to the value added service is no longer available, and terminate such access. Optionally, the reason for the termination of access also can be indicated in the negative acknowledgement 142. The charging gateway 116 also can communicate a suitable message to the appropriate value added service provider 118, 120, 122 indicating that access to the value added service is no longer available.

When the communication device 102 terminates its use of a value added service, the communication device 102 can send another value added service request 146 to the charging gateway 116. If the amount of credit reserved, authorized and/or debited for the communication device's use of the value added services has not been depleted, the charging gateway can simulate another telephone call placed to a pseudo telephone number in order to credit an unused portion of the corresponding fee to the credit account of the communication device 102/user. This time, the pseudo telephone number can correspond to the amount of credit to be applied to the user's credit account. The intelligent network 112 can process the corresponding call request 138 as previously described.

For example, if the credit to be applied is a first amount, the pseudo telephone number can be a third pseudo telephone number, for instance 333-2111. If the credit to be applied is a second amount, the pseudo telephone number can be a fourth pseudo telephone number that is different than the third pseudo telephone number (e.g. 333-3112), and so on. In this regard, a pseudo telephone number can be provided for each amount that may be possibly credited. Alternatively, multiple telephone calls can be simulated in order to credit the entire amount due. By way of example, if the initial credit reserved and/or authorized was one dollar, but only fifty-five cents worth of value added services were used, the pseudo telephone number used for the simulated telephone call can correspond to forty-five cents.

Figure 2:
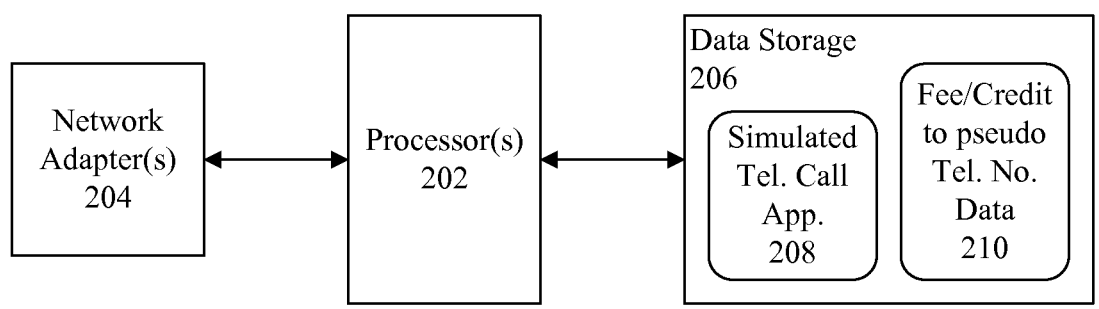
FIG. 2 depicts a block diagram of a charging gateway that is useful for understanding the present invention.

FIG. 2 depicts a block diagram of a charging gateway 116 that is useful for understanding the present invention. The charging gateway 116 can include a processor 202, which may comprise, for example, one or more central processing units (CPUs), one or more digital signal processors (DSPs), one or more application specific integrated circuits (ASICs), one or more programmable logic devices (PLDs), a plurality of discrete components that can cooperate to process data, and/or any other suitable processing device. In an arrangement in which a plurality of such components are provided, the components can be coupled together to perform various processing functions as described herein.

One or more network adapters 204 also can be provided with the charging gateway 116. For example, the charging gateway 116 can include one or more wired network adapters 204 and/or one or more wireless network adapters 204. Network adapters are well known to those skilled in the art. The network adapter(s) 204 can be used by the charging gateway to communicate with other devices in the communication system, for example STPs, SMSC servers, SMPPs, value added service providers, etc.

The charging gateway 116 further can include at least one data storage 206 communicatively linked to the processor 202. The data storage 206 can include one or more storage devices, each of which may include, but is not limited to, a magnetic storage medium, an electronic storage medium, an optical storage medium, a magneto-optical storage medium, and/or any other storage medium suitable for storing digital information. In one arrangement, the data storage 206 can be integrated into the processor 202, though this need not be the case. The data storage 206 also may be communicatively linked to the processor(s) 202 in another suitable manner, for instance via the network adapter(s) 204.

A simulated telephone call application 208 can be stored on the data storage 206 or otherwise made accessible to the processor(s) 202. The simulated telephone call application 208 can be executed by the processor(s) 202 to implement the methods and processes described herein that are performed by the charging gateway 116. For example, the processor(s) 202 can execute the simulated telephone call application 208 to receive, via the network adapter(s) 204, value added service requests. The processor(s) 202 also can, in real time, translate the value added service requests to pseudo telephone numbers and simulate telephone calls to the pseudo telephone numbers. Further, the processor(s) 202 can, via the network adapter(s) 204, communicate call requests, receive acknowledgements, grant and deny access to the value added services, communicate with value added service providers, and so on.

Data 210 which correlates fees/credits to be applied to credit accounts also can be stored on the data storage 206, or otherwise made accessible to the processor(s) 202. While executing the simulated telephone call application 208, the processor(s) 202 can access the data 210 to transform requested fees and/or credits into pseudo telephone numbers to which the telephone calls are simulated, for instance as previously described.

Figure 3:
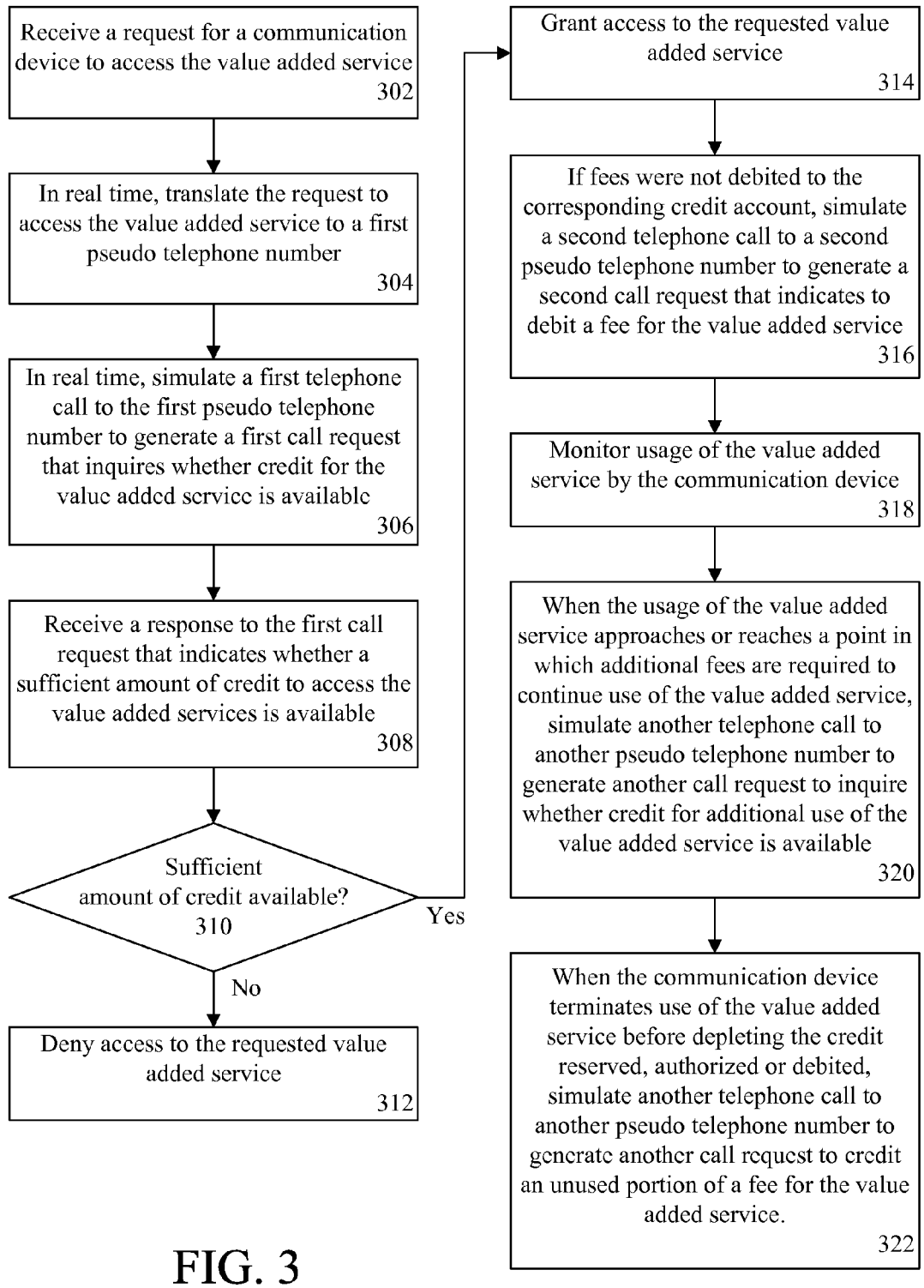
FIG. 3 is a flowchart presenting a method of translating a fee for a value added service in a communication network, which is useful for understanding the present invention.

FIG. 3 is a flowchart presenting a method 300 of translating a fee for a value added service in a communication network, which is useful for understanding the present invention. At step 302, a request for a communication device to access the value added service can be received. For example, a value added service request can be received from a communication device or a SMSC server.

At step 304, the request to access the value added service can be translated, in real time, to a first pseudo telephone number. At step 306, a first telephone call to the first pseudo telephone number can be simulated, in real time, to generate a first call request that inquires whether credit for the value added service is available. The request can be communicated to, for example, an intelligent network. At step 308, a response to the first call request can be received. The response can indicate whether a sufficient amount of credit to access the value added services is available.

Referring to decision box 310, when the response to the first call request indicates that the sufficient amount of credit is not available, at step 312 access to the requested value added service can be denied. When the response to the first call request indicates that the sufficient amount of credit is available, however, at step 314 access to the requested value added service can be granted.

At step 316, if fees were not debited to the corresponding credit account, for example in response to step 306, at step 316 a second telephone call to a second pseudo telephone number can be simulated to generate a second call request that indicates to debit a fee for the value added service.

At step 318, usage of the value added service by the communication device can be monitored. At step 320, when the usage of the value added service approaches or reaches a point in which additional fees are required to continue use of the value added service, another telephone call to another pseudo telephone number can be simulated to generate a second call request that indicates to credit an unused portion of a fee for the value added service.

At step 322, when the communication device terminates use of the value added service before depleting the credit reserved, authorized or debited, another telephone call to another pseudo telephone number can be simulated to generate another call request to credit an unused portion of a fee for the value added service.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

The present invention can be realized in hardware, software, or a combination of hardware and software. The present invention can be realized in a centralized fashion in one processing system or in a distributed fashion where different elements are spread across several interconnected processing systems. Any kind of processing system or other apparatus adapted for carrying out the methods described herein is suited. A typical combination of hardware and software can be a processing system with computer-usable program code that, when being loaded and executed, controls the processing system such that it carries out the methods described herein. The present invention also can be embedded in a computer-usable medium, such as a computer program product or other data programs storage device, readable by a machine, tangibly embodying a program of instructions executable by the machine to perform methods and processes described herein. The present invention also can be embedded in an application product which comprises all the features enabling the implementation of the methods described herein and, which when loaded in a processing system, is able to carry out these methods.

The terms "computer program," "software," "application," variants and/or combinations thereof, in the present context, mean any expression, in any language, code or notation, of a set of instructions intended to cause a system having an information processing capability to perform a particular function either directly or after either or both of the following: a) conversion to another language, code or notation; b) reproduction in a different material form. For example, an application can include, but is not limited to, a script, a subroutine, a function, a procedure, an object method, an object implementation, an executable application, an applet, a servlet, a MIDlet, a source code, an object code, a shared library/dynamic load library and/or other sequence of instructions designed for execution on a processing system.

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e. open language).

Moreover, as used herein, ordinal terms (e.g. first, second, third, fourth, fifth, sixth, seventh, eighth, ninth, tenth, and so on) distinguish one message, signal, item, object, device, system, apparatus, step, process, or the like from another message, signal, item, object, device, system, apparatus, step, process, or the like. Thus, an ordinal term used herein need not indicate a specific position in an ordinal series. For example, a process identified as a "second process" may occur before a process identified as a "first process." Further, one or more processes may occur between a first process and a second process.

This invention can be embodied in other forms without departing from the spirit or essential attributes thereof Accordingly, reference should be made to the following claims, rather than to the foregoing specification, as indicating the scope of the invention.

What is claimed is:

1. A method of translating fees for a value added service in a communication network, comprising:
   receiving a request for a communication device to access the value added service;
   in real time, translating the request to access the value added service to a first pseudo telephone number;
   in real time, simulating a first telephone call to the first pseudo telephone number to generate a first call request that inquires whether credit for the value added service is available;
   receiving a response to the first call request that indicates whether a sufficient amount of credit to access the value added services is available;
   when the response to the first call request indicates that the sufficient amount of credit is available, granting access to the requested value added service; and
   when the response to the first call request indicates that the sufficient amount of credit is not available, denying access to the requested value added service.

2. The method of claim 1, wherein receiving the request for the communication device to access the value added service comprises receiving the request from the communication device.

3. The method of claim 1, wherein receiving the request for the communication device to access the value added service comprises receiving the request from a short messaging service center (SMSC) server.

4. The method of claim 1, further comprising;
   communicating the first call request to an intelligent network.

5. The method of claim 1, further comprising:
   communicating a value added service request to a value added service provider.

6. The method of claim 1, further comprising:
   simulating a second telephone call to a second pseudo telephone number to generate a second call request that indicates to debit a fee for the value added service.

7. The method of claim 1, further comprising:
   monitoring a usage of the value added service by the communication device; and
   when the usage of the value added service approaches or reaches a point in which additional fees are required to continue use of the value added service, simulating a second telephone call to a second pseudo telephone number to generate a second call request to inquire whether credit for additional use of the value added service is available.

8. The method of claim 1, further comprising:
simulating a second telephone call to a second pseudo telephone number to generate a second call request to credit an unused portion of a fee for the value added service.

9. A charging gateway, comprising:
a processor that:
receives a request for a communication device to access a value added service;
in real time, translates the request to access the value added service to a first pseudo telephone number;
in real time, simulates a first telephone call to the first pseudo telephone number to generate a first call request that inquires whether credit for the value added service is available;
receives a response to the first call request that indicates whether a sufficient amount of credit to access the value added services is available;
when the response to the first call request indicates that the sufficient amount of credit is available, grants access to the requested value added service; and
when the response to the first call request indicates that the sufficient amount of credit is not available, denies access to the requested value added service.

10. The charging gateway of claim 9, wherein the processor receives the request for the communication device to access the value added service from the communication device.

11. The charging gateway of claim 9, wherein the processor receives the request for the communication device to access the value added service from a short messaging service center (SMSC) server.

12. The charging gateway of claim 9, wherein the processor communicates the first call request to an intelligent network.

13. The charging gateway of claim 9, wherein the processor communicates a value added service request to a value added service provider.

14. The charging gateway of claim 9, wherein the processor simulates a second telephone call to a second pseudo telephone number to generate a second call request that indicates to debit a fee for the value added service.

15. The charging gateway of claim 9, wherein the processor monitors a usage of the value added service by the communication device and, when the usage of the value added service approaches or reaches a point in which additional fees are required to continue use of the value added service, simulates a second telephone call to a second pseudo telephone number to generate a second call request to inquire whether credit for additional use of the value added service is available.

16. The charging gateway of claim 9, wherein the processor simulates a second telephone call to a second pseudo telephone number to generate a second call request to credit an unused portion of a fee for the value added service.

17. A non-transitory computer readable medium storing instructions for use in the execution of a computer of a method that translates fees for a value added service in a communication network, the method comprising:
translating the request to access the value added service to a first pseudo telephone number;
simulating a first telephone call to the first pseudo telephone number to generate a first call request that inquires whether credit for the value added service is available;
receiving a response to the first call request that indicates whether a sufficient amount of credit to access the value added services is available;
when the response to the first call request indicates that the sufficient amount of credit is available, granting access to the requested value added service; and
when the response to the first call request indicates that the sufficient amount of credit is not available, denying access to the requested value added service.

18. The non-transitory computer readable medium of claim 17, wherein the step of receiving the request for the communication device to access the value added service comprises:
receiving the request from the communication device.

19. The non-transitory computer readable medium of claim 17, wherein the step of receiving the request for the communication device to access the value added service comprises:
receiving the request from a short messaging service center (SMSC) server.

20. The non-transitory computer readable medium of claim 17, wherein the method further comprises the first call request to an intelligent network.

* * * * *